United States Patent
Matsubara et al.

(10) Patent No.: US 10,449,950 B2
(45) Date of Patent: Oct. 22, 2019

(54) CONTROL APPARATUS FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Keigo Matsubara, Nagoya (JP); Chikashi Ohta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 15/610,933

(22) Filed: Jun. 1, 2017

(65) Prior Publication Data

US 2017/0361833 A1 Dec. 21, 2017

(30) Foreign Application Priority Data

Jun. 16, 2016 (JP) ................... 2016-119961

(51) Int. Cl.
*B60W 20/30* (2016.01)
*B60W 10/02* (2006.01)
(Continued)

(52) U.S. Cl.
CPC .......... *B60W 20/30* (2013.01); *B60W 10/026* (2013.01); *B60W 10/06* (2013.01);
(Continued)

(58) Field of Classification Search
CPC .... B60W 20/30; B60W 10/026; B60W 10/06; B60W 10/11; B60W 10/115; B60W 30/18072; B60W 30/18127
See application file for complete search history.

(56) References Cited

U.S. PATENT DOCUMENTS 4,038,889 A * 8/1977 Lindow ............... F16H 61/0206
477/148
4,473,882 A * 9/1984 Suzuki ................. B60W 10/06
192/3.31
(Continued)

FOREIGN PATENT DOCUMENTS

CN 102770295 A 11/2012
JP 2006-101586 A 4/2006
(Continued)

*Primary Examiner* — Behrang Badii
*Assistant Examiner* — Daniel L Greene
(74) *Attorney, Agent, or Firm* — Oliff PLC

(57) ABSTRACT

A control apparatus for a vehicle includes an electronic control unit that is configured to set a value of a target generated voltage of the generator. The electronic control unit is configured to execute power generation control to control a generated voltage of a generator. The electronic control unit is configured to maintain a value of the generated voltage in the power generation control to be constant during an upshift gear change when the upshift gear change control of a transmission is executed while the lock-up clutch control is executed during deceleration of the vehicle. The electronic control unit is configured to increase the value in the power generation control during the downshift control to the value of the target generated voltage at a first specified rate when a downshift gear change of the transmission is executed while the lock-up clutch control is executed during the deceleration.

5 Claims, 6 Drawing Sheets

(51) Int. Cl.
*B60W 10/08* (2006.01)
*B60W 10/115* (2012.01)
*B60W 10/06* (2006.01)
*B60W 10/11* (2012.01)
*B60W 30/18* (2012.01)
*B60W 30/19* (2012.01)

(52) U.S. Cl.
CPC ............ *B60W 10/08* (2013.01); *B60W 10/11* (2013.01); *B60W 10/115* (2013.01); *B60W 30/18072* (2013.01); *B60W 30/18127* (2013.01); *B60W 30/19* (2013.01); *B60W 2030/18081* (2013.01); *B60W 2510/0233* (2013.01); *B60W 2510/0241* (2013.01); *B60W 2510/0604* (2013.01); *B60W 2510/0638* (2013.01); *B60W 2510/1005* (2013.01); *B60W 2520/10* (2013.01); *B60W 2710/024* (2013.01); *B60W 2710/025* (2013.01); *B60W 2710/0605* (2013.01); *B60W 2710/0644* (2013.01); *B60W 2710/083* (2013.01); *B60W 2710/1005* (2013.01); *B60W 2720/10* (2013.01); *Y10S 903/91* (2013.01); *Y10S 903/914* (2013.01); *Y10S 903/919* (2013.01); *Y10S 903/93* (2013.01); *Y10S 903/945* (2013.01); *Y10S 903/946* (2013.01)

(56) References Cited

U.S. PATENT DOCUMENTS

| | | | | |
|---|---|---|---|---|
| 4,662,249 | A * | 5/1987 | Miki | F16H 61/0206 477/132 |
| 5,771,478 | A * | 6/1998 | Tsukamoto | B60K 6/365 180/65.25 |
| 6,396,165 | B1 * | 5/2002 | Nagano | B60K 6/42 290/40 R |
| 6,736,753 | B2 * | 5/2004 | Endo | B60K 6/44 477/3 |
| 2003/0109970 | A1 * | 6/2003 | Nakamori | B60K 6/365 701/22 |
| 2011/0239801 | A1 | 10/2011 | Inagaki et al. | |
| 2018/0163857 | A1 * | 6/2018 | Ishihara | F16H 61/0021 |

FOREIGN PATENT DOCUMENTS

| | | |
|---|---|---|
| JP | 2011-213252 A | 10/2011 |
| JP | 2013-128344 A | 6/2013 |
| JP | 2015-171263 A | 9/2015 |

* cited by examiner

FIG. 2

|     | C1 | C2 | C3 | C4 | B1 | B2 |
|-----|----|----|----|----|----|----|
| 1st | O  | —  | —  | —  | —  | O  |
| 2nd | O  | —  | —  | —  | O  | —  |
| 3rd | O  | —  | O  | —  | —  | —  |
| 4th | O  | —  | —  | O  | —  | —  |
| 5th | O  | O  | —  | —  | —  | —  |
| 6th | —  | O  | —  | O  | —  | —  |
| 7th | —  | O  | O  | —  | —  | —  |
| 8th | —  | O  | —  | —  | O  | —  |
| Rev | —  | —  | O  | —  | —  | O  |

CONTROL APPARATUS FOR VEHICLE AND CONTROL METHOD FOR VEHICLE

INCORPORATION BY REFERENCE

The disclosure of Japanese Patent Application No. 2016-119961 filed on Jun. 16, 2016 including the specification, drawings and abstract is incorporated herein by reference in its entirety.

BACKGROUND

1. Technical Field

The disclosure relates to a control apparatus and a control method applied to a vehicle that includes an engine, a transmission, a lock-up clutch, and a generator.

2. Description of Related Art

In control of a lock-up clutch provided in a vehicle transmission, complete engagement control to completely engage the lock-up clutch and slip engagement control (hereinafter also referred to as slip control) to control actual differential rotation of the lock-up clutch (a rotational speed difference between an input rotational speed and an output rotational speed of the clutch) to target differential rotation are executed.

A technique related to such lock-up clutch control and power generation control of a generator is described in Japanese Patent Application Publication No. 2006-101586 (JP 2006-101586 A). In the technique described in JP 2006-101586 A, when a specified vehicle deceleration state is detected, an output voltage of an alternator (the generator) is controlled to a high voltage, an engaged state of the lock-up clutch (a direct-coupling clutch) is changed to a slipping state or a fastened state (a completely engaged state), and, furthermore, a fuel supply to the engine is cut. In this way, an engine speed is suppressed from being reduced to a fuel-cut recovery speed, and a generated voltage (a regenerative electric power amount) of the generator is increased. In such control, before the control of the lock-up clutch is initiated, the output voltage of the alternator is switched to the high voltage at a time point at which occurrence of the specified deceleration state is predicted. In this way, switching (a change) of the generated voltage is prevented from influencing the lock-up clutch control.

SUMMARY

In the vehicle in which the lock-up clutch control, gear change control, and the power generation control can be executed, when the gear change control is added to the lock-up clutch control and the power generation control during deceleration of the vehicle (at a time of the deceleration of the vehicle), the lock-up clutch control may not be executed appropriately due to a change in engine torque.

The disclosure provides a control apparatus and a control method capable of appropriately executing lock-up clutch control even when gear change control is added to the lock-up clutch control and power generation control in a vehicle in which the lock-up clutch control, the gear change control, and the power generation control can be executed.

A first aspect of the disclosure is a control apparatus for a vehicle. The vehicle includes an engine, a transmission, a generator, and an electronic control unit. The transmission is provided with a lock-up clutch. The generator is configured to be driven by drive power of the engine to generate electric power. The electronic control unit is configured to execute lock-up clutch control in which engagement control of the lock-up clutch is executed. The electronic control unit is configured to execute gear change control in which gear change control of the transmission is executed. The gear change control includes upshift gear change control and downshift gear change control. The upshift gear change control is control to upshift a specified gear ratio of the transmission to a gear ratio on a high-speed side. The downshift gear change control is control to downshift the specified gear ratio of the transmission to a gear ratio on a low-speed side. The electronic control unit is configured to set a value of a target generated voltage of the generator. The electronic control unit is configured to execute power generation control to control a generated voltage of the generator. The electronic control unit is configured to maintain a value of the generated voltage in the power generation control to be constant during the upshift gear change control when the electronic control unit determines that the upshift gear change control of the transmission is executed while the lock-up clutch control is executed during deceleration of the vehicle. The electronic control unit is configured to increase the value of the generated voltage in the power generation control during the downshift gear change control to the value of the target generated voltage at a first specified rate when the electronic control unit determines that the downshift gear change control of the transmission is executed while the lock-up clutch control is executed during the deceleration of the vehicle.

The lock-up clutch control at least includes control to completely engage the lock-up clutch and control to engage the lock-up clutch while causing the lock-up clutch to slip. According to the configuration, when the upshift gear change control is executed while the lock-up clutch control is executed during the deceleration of the vehicle, the value of the generated voltage (load torque) in the power generation control is maintained to be constant during the upshift gear change control. Thus, even when the upshift gear change control is added to the lock-up clutch control and the power generation control during the deceleration of the vehicle, a change in engine torque can be suppressed. In this way, the lock-up clutch control can appropriately be executed.

In addition, according to the configuration, when the downshift gear change control is executed while the lock-up clutch control is executed during the deceleration of the vehicle, the value of the generated voltage in the power generation control is increased to the value of the target generated voltage at the specified rate during the downshift gear change control. When the downshift gear change control is executed, just as described, the generated voltage in the power generation control is increased at the specified rate. Thus, regenerative electric power can be generated during the deceleration of the vehicle while the change in the engine torque, which is caused by an increase in the generated voltage (an increase in the load torque), is prevented from influencing the lock-up clutch control. In this way, fuel economy can be improved.

In the control apparatus for the vehicle, the electronic control unit may be configured to maintain the value of the generated voltage to be constant during the gear change control when the electronic control unit determines that the lock-up clutch control is not executed during the deceleration of the vehicle but the gear change control of the transmission is executed. According to the configuration, the change in the engine torque during the gear change control can be suppressed. Thus, the gear change control (hydraulic control) of the transmission can appropriately be executed.

In the control apparatus for the vehicle, the electronic control unit may be configured to continue maintaining the value of the generated voltage until a specified time elapses from termination of the gear change control when the value of the generated voltage is maintained to be constant during the gear change control. According to the configuration, processing of maintaining the value of the generated voltage in the power generation control to be constant is continued until the specified time (time required for an engine speed to be stabilized) elapses from the termination of the gear change control. Accordingly, the change in the engine torque, which is caused by a change in the generated voltage, is less likely to be added to a fluctuation in the engine speed immediately after the termination of the gear change control. Thus, engine control is stabilized.

In the control apparatus for the vehicle, the electronic control unit may be configured to increase the value of the generated voltage in the power generation control to the value of the target generated voltage at a second specified rate when the electronic control unit determines that the lock-up clutch control is executed during the deceleration of the vehicle but the gear change control is not executed. The second specified rate may be a rate of a higher increase tendency than the first specified rate. According to the configuration, a larger amount of regenerative electric power than that during the gear change control can be generated while the lock-up clutch control is appropriately executed. In this way, fuel economy can be improved.

In the control apparatus for the vehicle, the electronic control unit may be configured to increase the value of the generated voltage in the power generation control to the value of the target generated voltage at the second specified rate when the electronic control unit determines that the lock-up clutch control is not executed during the deceleration of the vehicle and the gear change control is not executed. According to the configuration, the larger amount of the regenerative electric power than that during the gear change control can be generated. In this way, the fuel economy can be improved.

A second aspect of the disclosure is a control method for a vehicle. The vehicle includes an engine, a transmission, a generator, and an electronic control unit. The transmission is provided with a lock-up clutch. The generator is configured to be driven by drive power of the engine to generate electric power. The control method includes: executing, by the electronic control unit, lock-up clutch control, in which engagement control of the lock-up clutch is executed; executing, by the electronic control unit, gear change control, in which gear change control of the transmission is executed; setting, by the electronic control unit, a value of a target generated voltage of the generator; controlling, by the electronic control unit, a generated voltage of the generator; maintaining, by the electronic control unit, a value of the generated voltage in power generation control to be constant during upshift gear change control when the electronic control unit determines that the upshift gear change control of the transmission is executed while the lock-up clutch control is executed during deceleration of the vehicle; and increasing, by the electronic control unit, the value of the generated voltage in the power generation control to the value of the target generated voltage at a specified rate during downshift gear change control when the electronic control unit determines that the downshift gear change control of the transmission is executed while the lock-up clutch control is executed during the deceleration of the vehicle. The gear change control includes the upshift gear change control and the downshift gear change control. The upshift gear change control is control to upshift a specified gear ratio of the transmission to a gear ratio on a high-speed side. The downshift gear change control is control to downshift the specified gear ratio of the transmission to a gear ratio on a low-speed side.

The lock-up clutch control at least includes control to completely engage the lock-up clutch and control to engage the lock-up clutch while causing the lock-up clutch to slip. According to the configuration, the value of the generated voltage (load torque) in the power generation control is maintained to be constant during the upshift gear change control when the upshift gear change control is executed while the lock-up clutch control is executed during the deceleration of the vehicle. Accordingly, even when the upshift gear change control is added to the lock-up clutch control during the deceleration of the vehicle and the power generation control, a change in engine torque can be suppressed. In this way, the lock-up clutch control can appropriately be executed.

In addition, according to the configuration, the value of the generated voltage in the power generation control is increased to the value of the target generated voltage at the specified rate during the downshift gear change control when the downshift gear change control is executed while the lock-up clutch control is executed during the deceleration of the vehicle. When the downshift gear change control is executed, just as described, the generated voltage in the power generation control is increased at the specified rate. Thus, regenerative electric power can be generated during the deceleration of the vehicle while the change in the engine torque, which is caused by an increase in the generated voltage (an increase in the load torque), is prevented from influencing the lock-up clutch control. In this way, the fuel economy can be improved.

According to the disclosure, even when the gear change control is added to the lock-up clutch control and the power generation control in the vehicle in which the lock-up clutch control, the gear change control, and the power generation control can be executed, the lock-up clutch control can appropriately be executed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is an engagement table that illustrates engaged states of a clutch and a brake at each gear stage in an automatic transmission shown in FIG. 1;

FIG. 4 is a block diagram of a configuration of a control system that includes an ECU and the like;

DETAILED DESCRIPTION OF EMBODIMENTS

A description will hereinafter be made on an embodiment of the disclosure on the basis of drawings.

Figure 1:
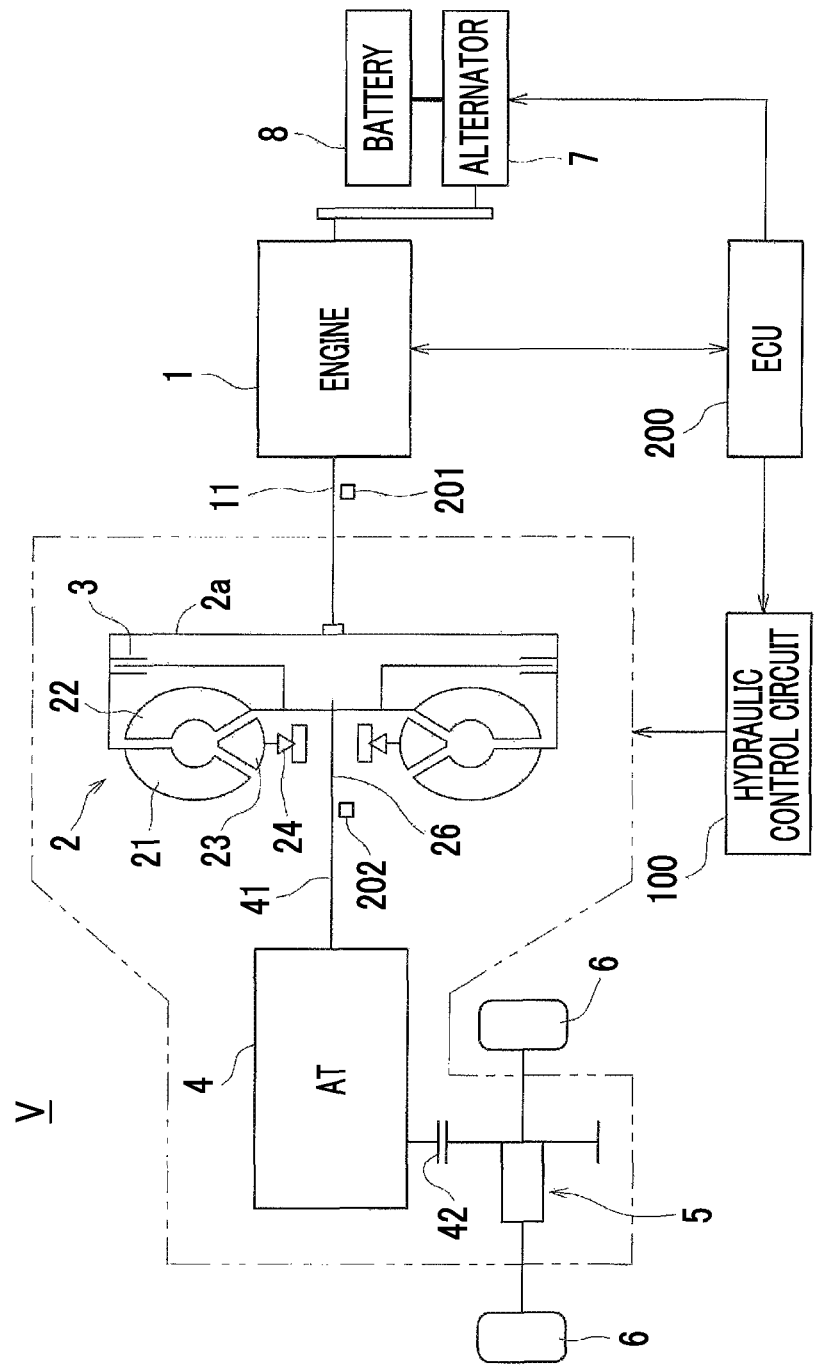
FIG. 1 is a schematic configuration diagram of one example of a vehicle to which the disclosure is applied.

Referring to FIG. 1, a description will first be made on one example of a vehicle to which the disclosure is applied.

A vehicle V in this example is a vehicle adopting a front-engine, front-wheel-drive (FF) layout and includes an engine 1, a torque converter 2, a multi-plate lock-up clutch 3, an automatic transmission (AT) 4, a differential 5, drive wheels (front wheels) 6, driven wheels (rear wheels: not shown), an alternator 7, a battery (a power storage device) 8, a hydraulic control circuit 100, an electronic control unit (ECU) 200, and the like.

A description will hereinafter be made on each of these engine 1, torque converter 2, multi-plate lock-up clutch 3, automatic transmission 4, alternator 7, hydraulic control circuit 100, and ECU 200.

The engine 1 is a traveling drive power source and is, for example, a multi-cylinder gasoline engine. A crankshaft 11 as an output shaft of the engine 1 is coupled to the torque converter 2. A rotational speed of the crankshaft 11 (an engine speed) is detected by an engine speed sensor 201.

The torque converter 2 includes a pump impeller 21 on an input shaft side, a turbine runner 22 on an output shaft side, a stator 23 that realizes a torque amplification function, and a one-way clutch 24 and transmits power between the pump impeller 21 and the turbine runner 22 via fluid. In the torque converter 2, the multi-plate lock-up clutch 3 is provided to couple an input side and an output side of the torque converter 2 either directly or in a slipping state. A rotational speed of a turbine shaft 26 of the torque converter 2 (a turbine rotational speed) is detected by a turbine rotational speed sensor 202.

Figure 3:
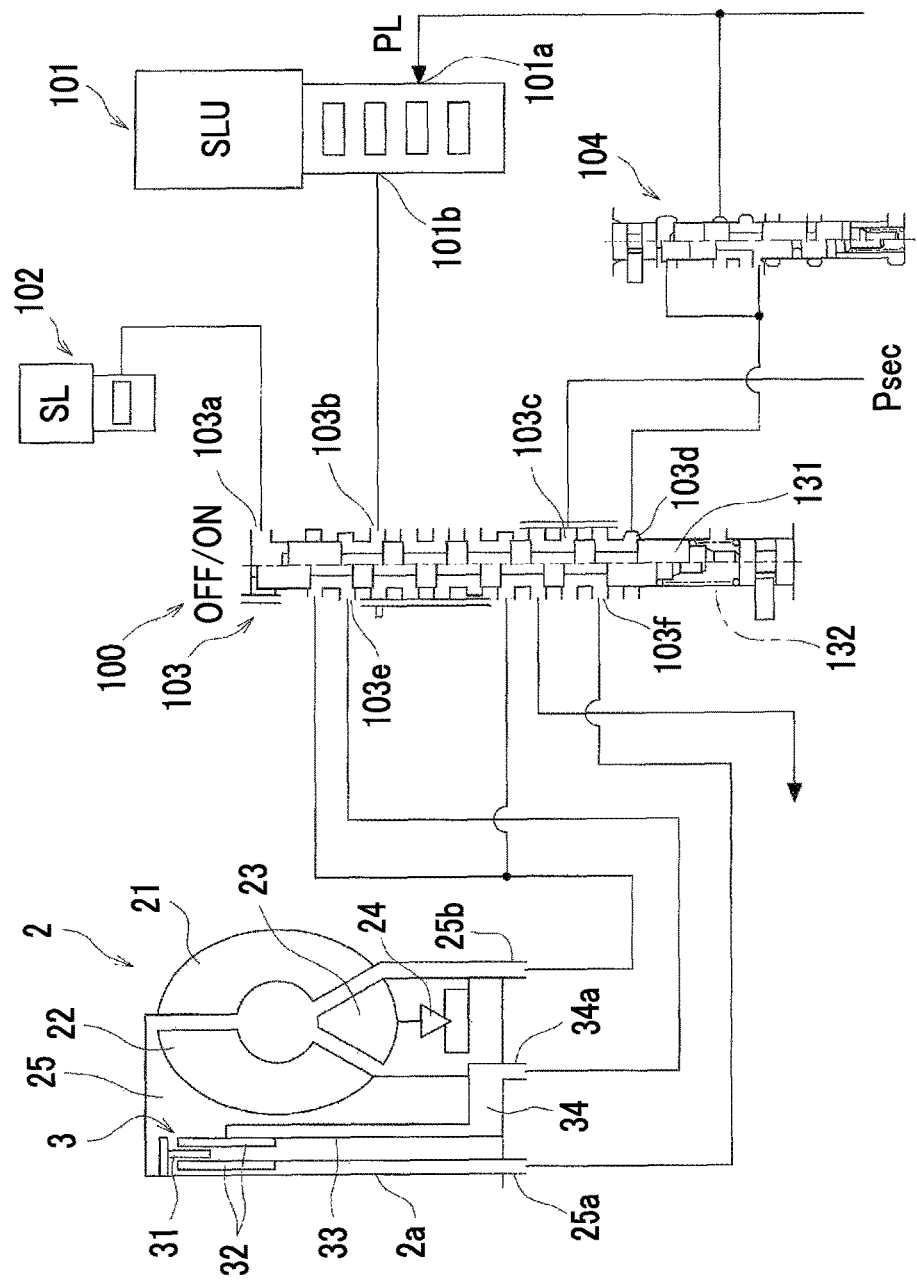
FIG. 3 is a circuit configuration diagram of a hydraulic control circuit.

As shown in FIG. 3, a converter fluid chamber 25 is provided in the torque converter 2, so as to circulate the operating fluid. The converter fluid chamber 25 is provided with: a T/C input port 25a from which the operating fluid is introduced; and a T/C output port 25b to which the operating fluid is discharged.

As shown in FIG. 3, the multi-plate lock-up clutch 3 includes clutch plates (friction engagement plates) 31, 32 and a lock-up piston 33 capable of pressing those clutch plates 31, 32. The clutch plate 31 is supported by a clutch hub, which is fixed to a front cover 2a of the torque converter 2, in an axially slidable manner. The clutch plate 32 is supported by a clutch hub, which is connected to the turbine runner 22, in an axially slidable manner. The lock-up piston 33 is provided in the torque converter 2 in an axially slidable manner. A lock-up fluid chamber 34 is provided on a back surface side (an opposite side from the front cover 2a) of the lock-up piston 33. The lock-up fluid chamber 34 is provided with an L/U pressure input port 34a, from which the operating fluid is introduced (hydraulic pressure is introduced) and to which the operating fluid is discharged.

In the multi-plate lock-up clutch 3 with such a structure, when the hydraulic pressure is supplied to the lock-up fluid chamber 34, the clutch plate 31 and the clutch plate 32 are engaged with each other to bring the multi-plate lock-up clutch 3 into an engaged state (a completely engaged state or a slipping state). When a supply of the hydraulic pressure to the lock-up fluid chamber 34 is stopped, the lock-up piston 33 is actuated to a disengaged side due to an elastic force of a return spring (not shown) and brings the multi-plate lock-up clutch 3 into a disengaged state.

The automatic transmission 4 is a stepped transmission and includes plural hydraulic friction engagement elements and a planetary gear device. In the automatic transmission 4, plural gear stages (gear change stages) can selectively be established by selectively engaging the plural friction engagement elements. As shown in FIG. 1, an input shaft 41 of the automatic transmission 4 is coupled to the turbine shaft 26 of the torque converter 2. An output gear 42 of the automatic transmission 4 is coupled to the drive wheels 6 via the differential 5 and the like.

As shown in FIG. 2, the automatic transmission 4 includes, as the hydraulic friction engagement elements, a first clutch C1 to a fourth clutch C4 as well as a first brake B1 and a second brake B2, for example. By controlling engagement and disengagement of these four clutches C1 to C4 and two brakes B1, B2, eight forward gear stages (a first gear stage "1st", a second gear stage "2nd" to an eighth gear stage "8th") as well as a reverse gear stage (a reverse gear stage "Rev") are achieved. The engagement or the disengagement of each of these clutches C1 to C4 and brakes B1, B2 is controlled by the hydraulic control circuit 100.

The alternator 7 is coupled to the crankshaft 11 of the engine 1 via a pulley, a transmission belt, and the like. The alternator 7 is driven by some of drive power of the engine 1 to generate electric power. The electric power generated by the alternator 7 is supplied to various on-board electrical loads and the battery 8.

The alternator 7 includes an IC regulator that is configured by including: a stator coil as a three-phase coil that is wound around a stator; a rotor located on an inside of the stator coil; a field coil wound around the rotor; and a switching circuit, and the like, for example, and generates induced electric power in the stator coil by causing rotation of the field coil in an energized state. A generated voltage of such an alternator 7 is controlled by the ECU 200. In addition, by controlling the generated voltage of the alternator 7, an SOC (a charged voltage) of the battery 8 can be controlled (subjected to charging control).

Next, referring to FIG. 3, a description will be made on the hydraulic control circuit 100. Note that FIG. 3 only shows a hydraulic circuit configuration of the torque converter 2 and the multi-plate lock-up clutch 3.

First, the hydraulic control circuit 100 of this example includes an oil pump that is driven by the drive power of the engine 1 (there is also a case where an electric oil pump is provided), a primary regulator valve, a secondary regulator valve, and the like. Note that the oil pump, the primary regulator valve, the secondary regulator valve, and the like are not shown. The primary regulator valve regulates the hydraulic pressure that is generated by the oil pump. In this way, line pressure PL is generated. Then, the secondary regulator valve regulates the line pressure PL as source pressure to secondary pressure Psec.

The hydraulic control circuit 100, which is shown in FIG. 3, includes a linear solenoid valve (SLU) 101, a solenoid valve (SL) 102, a lock-up relay valve 103, a circulation modulator valve 104 (hereinafter referred to as a Cir-MOD valve 104), and the like.

By corresponding to a command (lock-up clutch instructed hydraulic pressure) from the ECU 200, the linear solenoid valve (SLU) 101 outputs control hydraulic pressure from an output port 101b. The control hydraulic pressure is generated by regulating the line pressure PL that is supplied to an input port 101a.

The solenoid valve (SL) 102 outputs signal pressure when being controlled to be ON by the command from the ECU 200. The Cir-MOD valve 104 outputs circulation modulator pressure (hereinafter referred to as Cir-MOD pressure) that is generated by regulating the line pressure PL. The lock-up relay valve 103 is a switching valve that is actuated by the signal pressure from the solenoid valve (SL) 102 and switches supply/discharge paths of the hydraulic pressure.

When the signal pressure from the solenoid valve (SL) 102 is not input to a signal pressure input port 103a (in a lock-up OFF state), a spool 131 of the lock-up relay valve 103 is disposed at an upper position in FIG. 3 (a position on a left side in FIG. 3) due to an urging force of a spring 132. In this way, the secondary pressure Psec is supplied to the T/C input port 25a (the converter fluid chamber 25) of the torque converter 2 via the lock-up relay valve 103 (ports 103c, 103f).

Meanwhile, when both of the linear solenoid valve (SLU) 101 and the solenoid valve (SL) 102 are turned on by the command from the ECU 200, and the signal pressure from the solenoid valve (SL) 102 is input to the signal pressure input port 103a of the lock-up relay valve 103 (in a lock-up ON state), the spool 131 moves downward against the urging force of the spring 132 and is disposed at a lower position in FIG. 3 (a position on a right side in FIG. 3). In this way, the Cir-MOD pressure from the Cir-MOD valve 104 is supplied to the T/C input port 25a (the converter fluid chamber 25) of the torque converter 2 via the lock-up relay valve 103 (the ports 103d, 103f). Furthermore, the control hydraulic pressure that is output by the linear solenoid valve (SLU) 101 is supplied to the L/U pressure input port 34a of the lock-up fluid chamber 34) of the multi-plate lock-up clutch 3 via the lock-up relay valve 103 (ports 103b, 103e). In this way, the multi-plate lock-up clutch 3 is brought into an engaged state (the completely engaged state or the slipping state).

The ECU 200 includes a central processing unit (CPU), read only memory (ROM), random access memory (RAM), backup RAM, and the like.

The ROM stores various control programs, maps that are referred when those various control programs are executed, and the like. The CPU performs arithmetic operations on the basis of the various control programs and the maps stored in the ROM. The RAM is memory that temporarily stores results of the operations by the CPU, input data from each of the sensors, and the like. The backup RAM is non-volatile memory used to store data and the like that should be stored at a stop of the engine 1 and the like.

Figure 4:
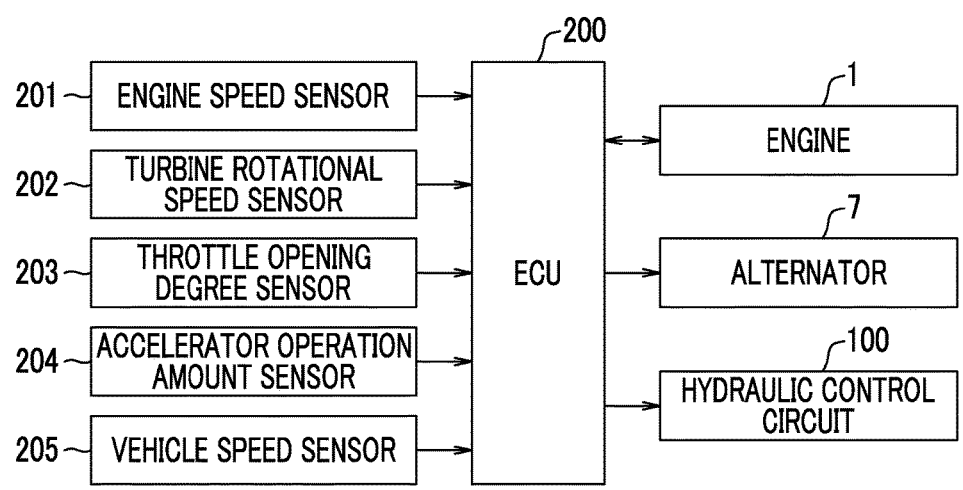

As shown in FIG. 4, various sensors such as the engine speed sensor 201, the turbine rotational speed sensor 202, a throttle opening degree sensor 203 that detects a throttle opening degree of a throttle valve (not shown), an accelerator operation amount sensor 204 that detects an accelerator operation amount as a depression amount of an accelerator pedal (not shown), and a vehicle speed sensor 205 that outputs a signal corresponding to a speed of the vehicle V are connected to the ECU 200. The ECU 200 receives a signal from each of these sensors (including switches).

The engine 1, the alternator 7, the hydraulic control circuit 100, and the like are also connected to the ECU 200.

The ECU 200 is configured to be able to control an operation state of the engine 1 by controlling the throttle opening degree, a fuel injection amount, ignition timing, and the like on the basis of detection results by the various sensors and the like. In addition, the ECU 200 executes fuel cut control.

The ECU 200 also executes gear change control (hydraulic control) of the automatic transmission 4, hydraulic control of the torque converter 2, and engagement control (also referred to as lock-up clutch control) of the multi-plate lock-up clutch 3 by controlling the hydraulic control circuit 100. The ECU 200 further executes power generation control, which will be described below.

Next, a description will be made on the fuel cut control that is executed by the ECU 200.

The fuel cut control is control to stop fuel injection of (cut a fuel supply to) the engine 1 when the engine speed, which is obtained from the output signal of the engine speed sensor 201, is equal to or higher than a specified threshold (a fuel-cut speed) in a deceleration state (accelerator OFF) of the vehicle V. When the engine speed becomes equal to or lower than a fuel-cut cancellation speed, the fuel cut control is canceled to prevent an engine stall (the fuel injection is resumed).

In such fuel cut control during deceleration of the vehicle, the engine speed is gently reduced by executing the lock-up clutch control (complete engagement control or slip control), so as to extend a time that is required for the engine speed to be reduced to the fuel-cut cancellation speed (to expand a fuel-cut region). Note that time during the deceleration of the vehicle and time during acceleration of the vehicle will also respectively be referred to as "during the deceleration" and "during the acceleration" in the following description.

In the gear change control of the automatic transmission 4 that is executed by the ECU 200, a target gear change stage is computed by referring to a gear change map on the basis of the vehicle speed and the accelerator operation amount, for example. The vehicle speed is obtained from the output signal of the vehicle speed sensor 205. The accelerator operation amount is obtained from the output signal of the accelerator operation amount sensor 204. The ECU 200 compares the target gear change stage and a current gear change stage (recognized from a current gear change command to the hydraulic control circuit 100, for example) and determines whether a gear change operation is necessary. Then, when the gear change is unnecessary (when the target gear change stage and the current gear change stage are the same and the gear change stage is appropriately set) from a determination result, the ECU 200 maintains the current gear change stage without outputting the gear change command to the hydraulic control circuit 100. On the other hand, when the target gear change stage differs from the current gear change stage, the ECU 200 outputs the gear change command to the hydraulic control circuit 100 and changes the gear change stage to achieve the target gear change stage.

Note that the above gear change map is a map which uses the vehicle speed and the accelerator operation amount as parameters and in which plural regions are set to compute an appropriate gear stage (any of the gear stages 1st to 8th at optimum efficiency) in accordance with those vehicle speed and accelerator operation amount, and is stored in the ROM of the ECU 200. In the gear change map, plural gear change lines are set to divide the regions (upshift gear change lines and downshift gear change lines used to divide the gear change regions from 1st to 8th).

Next, a description will be made on the lock-up clutch control that is executed by the ECU 200.

In the lock-up clutch control, the complete engagement control to completely engage the multi-plate lock-up clutch 3 or the slip control (differential rotation control) is executed. In the slip control, actual differential rotation between the engine speed, which is obtained from the output signal of the engine speed sensor 201, and the turbine rotational speed, which is obtained from the output signal of the turbine rotational speed sensor 202, is computed, and lock-up clutch hydraulic pressure is subjected to feedback control such that the actual differential rotation becomes target differential rotation.

The ECU 200 controls the generated voltage of the alternator 7. More specifically, the ECU 200 sets a target generated voltage (an instructed voltage) on the basis of the charged voltage that is required for the battery 8 (the charged voltage required to obtain a target charged voltage value) and the like, and sends a command of the target generated voltage (a voltage control command) to the IC regulator of the alternator 7. Then, the IC regulator executes duty control of a current (a field current) that flows through the field coil in accordance with the target generated voltage from the ECU 200, and thereby controls the generated voltage of the alternator 7.

In addition, in the power generation control of the alternator 7, as will be described below, due to relationships with the lock-up clutch control and the gear change control (upshift/downshift gear change control), control to fix the generated voltage (hold the generated voltage) of the alternator 7, control to gradually change the generated voltage (increase the generated voltage at a specified rate), or the like may have to be executed. The upshift gear change control is control to upshift a specified gear change stage of the transmission to a gear change stage on a high-speed side. The downshift gear change control is control to downshift the specified gear change stage of the transmission to a gear change stage on a low-speed side.

Here, when the gear change control of the automatic transmission 4 is added to the deceleration lock-up clutch control (the complete engagement control or the slip control) and the power generation control of the alternator 7, the lock-up clutch control may not be executed appropriately due to a change in engine torque.

In order to solve such a problem, in this embodiment, even when the gear change control is added to the lock-up clutch control and the power generation control in the vehicle V, in which the lock-up clutch control, the gear change control, and the power generation control can be executed, the power generation control that allows the appropriate execution of the lock-up clutch control is realized.

A description will be made on one example of the power generation control with reference to flowcharts in FIG. 5 and FIG. 6. A control routine in FIG. 5 and FIG. 6 is repeatedly executed at every specified time (for example, 4 msecs) in the ECU 200.

Figure 5:
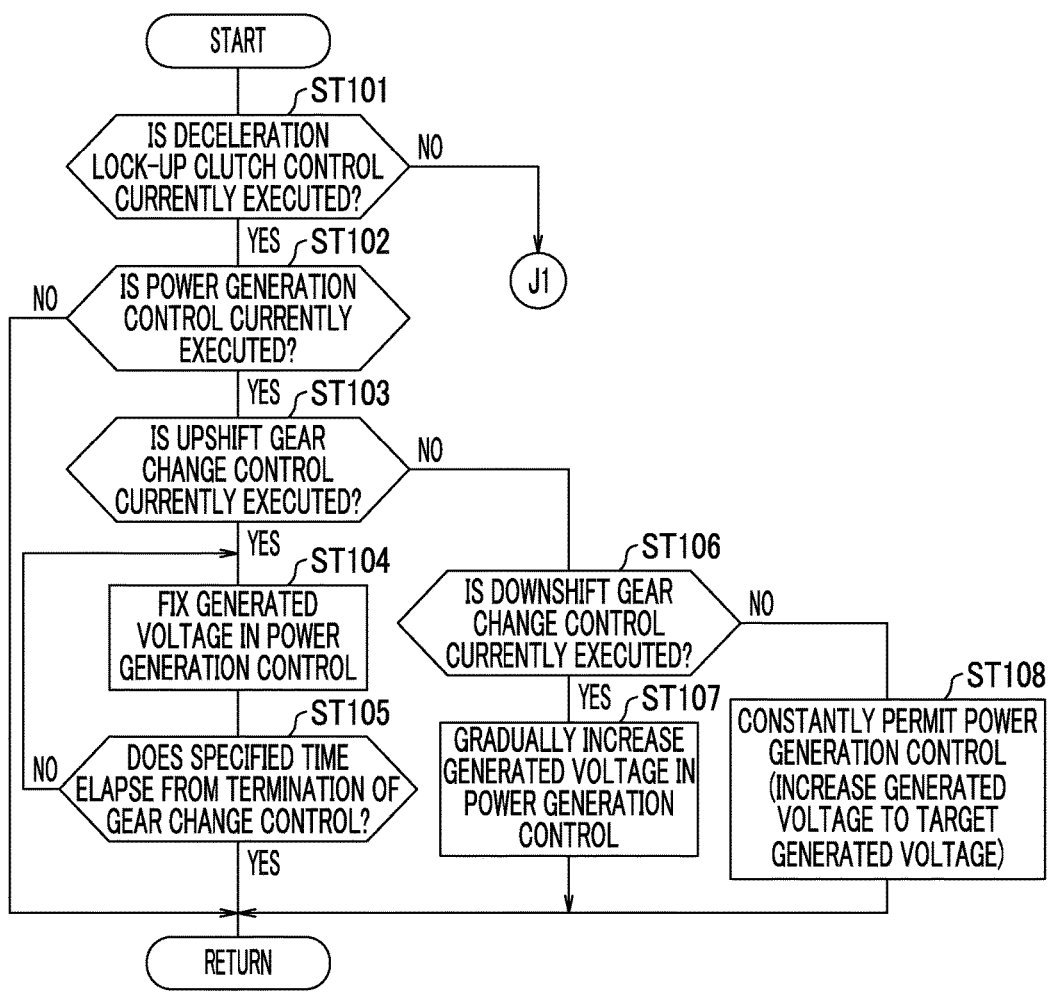
FIG. 5 is a flowchart of one example of power generation control executed by the ECU.
Figure 6:
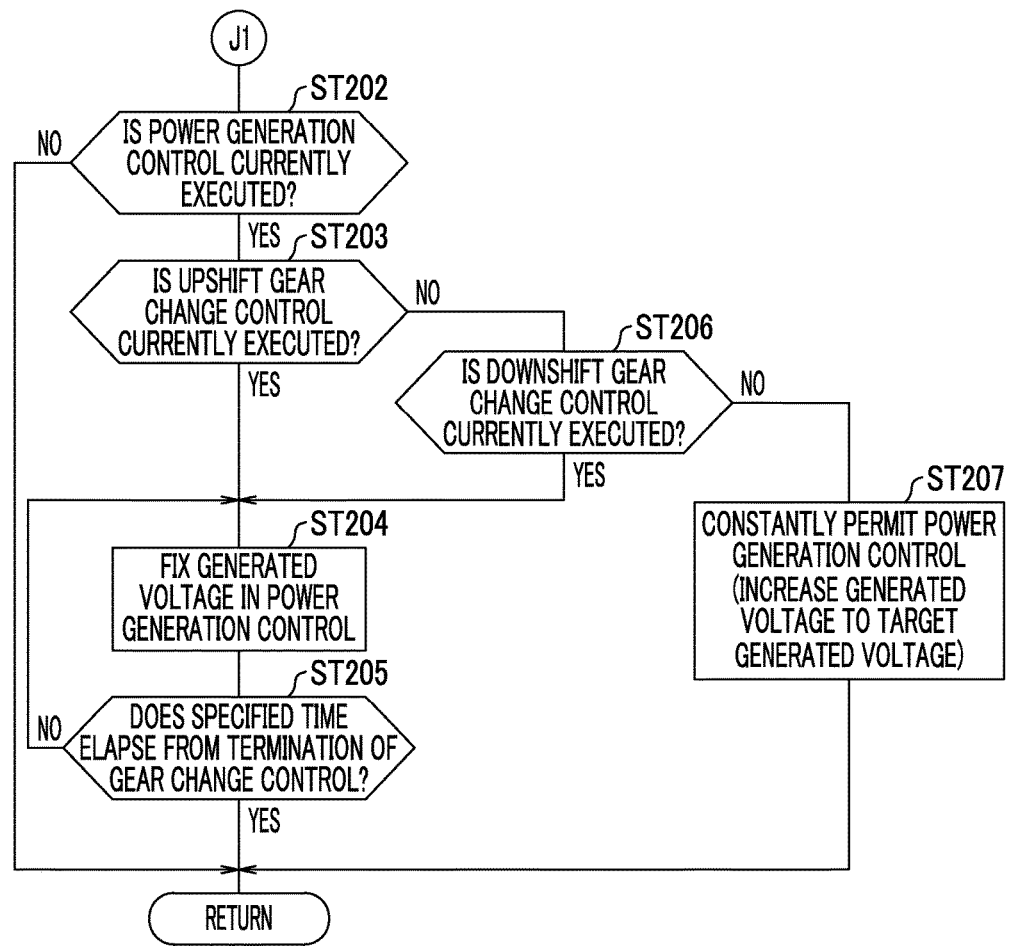
FIG. 6 is the flowchart of the example of the power generation control executed by the ECU.

When the control routine in FIG. 5 and FIG. 6 is initiated, it is first determined in step ST101 in FIG. 5 whether the deceleration lock-up clutch control (the complete engagement control or the slip control) is currently executed. If a determination result is a negative determination (NO), the process proceeds to step ST202 in FIG. 6. The process in step ST202 will be described below.

If the determination result in step ST101 is a positive determination (YES) (if the deceleration lock-up clutch control is currently executed), the process proceeds to step ST102. Note that the "determination during the deceleration" is made from the output signal of the vehicle speed sensor 205.

In step ST102, it is determined whether the power generation control is currently executed. If a determination result is a negative determination (NO), the process returns. If the determination result in step ST102 is a positive determination (YES), the process proceeds to step ST103. Note that the current execution of the power generation control is recognized from the voltage control command to the alternator 7, for example.

In step ST103, it is determined whether the upshift gear change control of the automatic transmission 4 is currently executed. If a determination result is a negative determination (NO), the process proceeds to step ST106. The process in step ST106 will be described below. If the determination result in step ST103 is positive (YES) (if the upshift gear change control is currently executed), the process proceeds to step ST104. Note that the current execution of the upshift gear change control is recognized from the current gear change command to the hydraulic control circuit 100, for example.

In step ST104, during the upshift gear change control, the generated voltage in the power generation control is fixed to a current value (the generated voltage is not changed during the upshift gear change control, that is, the generated voltage is maintained to be constant during the upshift gear change control). The process of fixing the generated voltage will be described below.

First, in a situation where the process proceeds to step ST104, the deceleration lock-up clutch control and the power generation control are currently executed, and the upshift gear change control is also currently executed.

Here, when the deceleration lock-up clutch control (the complete engagement control or the slip control) is currently executed, the vehicle is in a driven state (during the fuel cut) and also in a state where the engine torque is hardly generated. Accordingly, when the generated voltage in the power generation control is changed (load torque of the alternator 7 is changed), the engine torque is changed. The change in the engine torque makes it difficult to execute the deceleration lock-up clutch control. When the upshift gear change control (control to reduce the engine speed) is further executed in such a situation, a change in the engine speed is added to a change in the engine torque, which possibly prevents the appropriate execution of the deceleration lock-up clutch control. In view of such a point, in this embodiment, when the upshift gear change control is executed during the deceleration lock-up clutch control, the generated voltage (the load torque) in the power generation control is fixed so as to suppress the change in the engine torque. In this way, the deceleration lock-up clutch control can appropriately be executed.

The process in step ST104 described so far, that is, the process of fixing the generated voltage in the power generation control is continued until a specified time elapses from termination of the upshift gear change control. Then, at a time point at which a specified time elapses from termination of the gear change control (a time point at which the determination in step ST105 becomes YES), the process of fixing the generated voltage in the power generation control is terminated. Thereafter, the process returns.

Here, the specified time, which is used for the determination in step ST105, is a time that is required for the engine speed to be stabilized after the termination of the gear change control, and is set in advance by an experiment simulation. Then, just as described, the process of fixing the generated voltage in the power generation control is continued until the specified time elapses from the termination of the gear change control. In this way, the change in the engine torque due to the change in the generated voltage is less likely to be added to a fluctuation in the engine speed immediately after the termination of the gear change control. Thus, engine control can be stabilized.

On the other hand, if the determination result in above step ST103 is a negative determination (NO) (if the upshift gear change control is not currently executed), the process proceeds to step ST106, and it is determined whether the downshift gear change control is currently executed. If a determination result is a positive determination (YES), the process proceeds to step ST107.

In step ST107, the generated voltage in the power generation control is increased (gradually changed) from the current value to the target generated voltage (the necessary charged voltage) at the specified rate. The process of gradually changing the generated voltage will be described below.

First, in a situation where the process proceeds to step ST107, the deceleration lock-up clutch control and the power generation control are currently executed, and the downshift gear change control is also currently executed. Here, when the downshift gear change control is executed during the deceleration (while the vehicle is driven), the engine speed is increased. Accordingly, the generated voltage in the power generation control can be increased (regenerative electric power can be generated) while a reduction of the engine speed to the fuel-cut cancellation speed is suppressed. However, an excess increase in the generated voltage (the load torque) influences the lock-up clutch control. In consideration of such a point, in this embodiment, the generated voltage in the power generation control is increased (gradually changed) to the target generated voltage (the necessary charged voltage) in a first specified rate within a range of not intervening the lock-up clutch control (within a range where the increase in the generated voltage, that is, the change in the engine torque due to an increase in the load torque does not influence the lock-up clutch control). In this way, the regenerative electric power can be generated during the deceleration while the lock-up clutch control is appropriately executed.

If the determination result of above step ST106 is a negative determination (NO), that is, if the gear change control (the upshift gear change control and the downshift gear change control) is not executed during the deceleration lock-up clutch control and the power generation control, the process proceeds to step ST108.

In step ST108, the power generation control is constantly permitted. In other words, when the gear change control is not executed during the deceleration lock-up clutch control, the increase in the generated voltage (the load torque) in the power generation control does not influence the lock-up clutch control (the lock-up clutch control can appropriately be executed). Thus, the power generation control is constantly permitted. More specifically, in the power generation control, the generated voltage is increased to the target generated voltage (the necessary charged voltage) in a higher second specified rate than the first specified rate.

Next, if the determination result in above step ST101 is a negative determination (NO) (if the deceleration lock-up clutch control is not currently executed), the process proceeds to step ST202 in FIG. 6, and it is determined whether the power generation control is currently executed. If a determination result is a negative determination (NO), the process returns. If the determination result in ST202 is a positive determination (YES), the process proceeds to step ST203.

In step ST203, it is determined whether the upshift gear change control of the automatic transmission 4 is currently executed. If a determination result is a negative determination (NO), the process proceeds to step ST206. The process in step ST206 will be described below. If the determination result in step ST203 is a positive determination (YES) (if the upshift gear change control is currently executed), the process proceeds to step ST204.

In step ST204, during the upshift gear change control, the generated voltage in the power generation control is fixed to the current value (the generated voltage is not changed during the upshift gear change control). The process of fixing this generated voltage will be described below.

First, in a situation where the process proceeds to step ST204, the power generation control is currently executed in a state where the deceleration lock-up clutch control is not currently executed (a state where acceleration lock-up clutch control is currently executed or the multi-plate lock-up clutch 3 is currently disengaged), and the upshift gear change control is also currently executed. When the generated voltage (the load torque) is changed by the power generation control in such a situation, the engine torque is changed, which possibly makes it difficult to execute the hydraulic control of the automatic transmission 4. In consideration of such a point, in this embodiment, the generated voltage is fixed during the upshift gear change control. Note that, even when the generated voltage in the power generation control is increased during the acceleration lock-up clutch control (during the fuel injection), an effect of improving fuel economy is not obtained. Also from such a point, the generated voltage is fixed.

The process in step ST204 described so far, that is, the process of fixing the generated voltage in the power generation control is continued until the specified time elapses from the termination of the upshift gear change control. Then, at the time point at which the specified time elapses from the termination of the gear change control (a time point at which the determination in step ST205 becomes YES), the process of fixing the generated voltage in the power generation control is terminated. Thereafter, the process returns. Note that the specified time that is used for the determination in step ST205 is set to be the same as the specified time that is used for the determination in above step ST105.

On the other hand, if the determination result in above step ST203 is a negative determination (NO) (if the upshift gear change control is not currently executed), the process proceeds to step ST206, and it is determined whether the downshift gear change control is currently executed. If a determination result is a positive determination (YES), the process proceeds to step ST204. In step ST204, during the downshift gear change control, the generated voltage in the power generation control is fixed to the current value (the generated voltage is not changed during the downshift gear change control). A reason why the generated voltage is fixed is the same as the reason in the above case during the upshift gear change control (the case of the processes in step ST203 and step ST204).

If the determination result of step ST206 is a negative determination (NO), that is, if the gear change control (the upshift gear change control and the downshift gear change control) is not currently executed, the process proceeds to step ST207.

In step ST207, the power generation control is constantly permitted. In other words, when the gear change control is not executed, the increase in the generated voltage (the load torque) in the power generation control does not influence hydraulic system control such as the lock-up clutch control and the gear change control. Thus, the power generation control is constantly permitted. More specifically, in the power generation control, the generated voltage is increased to the target generated voltage (the necessary charged voltage) in the higher second specified rate than the above first specified rate.

As it has been described so far, according to this embodiment, the power generation control is executed while the lock-up clutch control is executed during the deceleration of the vehicle. When the upshift gear change control is further executed, the generated voltage in the power generation control (the load torque) is fixed during the upshift gear change control. Thus, even when the upshift gear change control is added to the lock-up clutch control and the power generation control during the deceleration, the change in the engine torque can be suppressed. In this way, the lock-up clutch control can appropriately be executed.

In addition, the power generation control is executed while the lock-up clutch control is executed during the deceleration of the vehicle. Then, the downshift gear change control is further executed. In such a case, during the downshift gear change control, the generated voltage in the power generation control is increased to the target generated voltage (the necessary charged voltage) at the rate of the first specified rate within the range of not intervening the lock-up clutch control. Accordingly, the regenerative electric power can be generated during the deceleration while the lock-up clutch control is appropriately executed. In this way, the fuel economy can be improved.

Meanwhile, in this embodiment, when the lock-up clutch control is not executed during the deceleration of the vehicle, the power generation control is executed. Then, the upshift gear change control or the downshift gear change control is further executed. In such a case, the generated voltage (the load torque) in the power generation control is fixed during the gear change control. Accordingly, the change in the engine torque can be suppressed, and sufficiency of the hydraulic pressure in the hydraulic control system (the hydraulic pressure of the hydraulic control circuit 100) can be guaranteed. In this way, the gear change control (the hydraulic control) of the automatic transmission 4 can appropriately be executed.

The engine speed is significantly changed, for example, when the power generation control is executed while the lock-up clutch control is executed during the deceleration of the vehicle and the upshift gear change control is further executed. In such a situation, when the generated voltage in the power generation control is fixed, the engine speed may fluctuate for a while even after the termination of the gear change control. In this embodiment, in the gear change control, the generated voltage keeps being fixed until the specified time elapses from the termination of the gear change control. Just as described, the process of fixing the generated voltage in the power generation control is continued until the specified time (the time required for the engine speed to be stabilized) elapses from the termination of the gear change control. In this way, the change in the engine torque due to the change in the generated voltage is less likely to be added to the fluctuation in the engine speed immediately after the termination of the gear change control. Thus, the engine control is stabilized.

In this embodiment, in the case where the gear change control is not executed while the lock-up clutch control is executed during the deceleration of the vehicle, the generated voltage in the power generation control is increased to the target generated voltage at the higher rate of the second specified rate than that of the first specified rate. Accordingly, a larger amount of the regenerative electric power than that during the gear change control can be generated while the lock-up clutch control is appropriately executed. In this way, the fuel economy can be improved.

In this embodiment, in the cases where the lock-up clutch control is not executed during the deceleration of the vehicle and the gear change control is not executed, the generated voltage in the power generation control is increased to the target generated voltage at the higher rate of the second specified rate than that of the first specified rate. Accordingly, the larger amount of the regenerative electric power than that during the gear change control can be generated. In this way, the fuel economy can be improved.

Note that the embodiment disclosed herein is merely illustrative in all respects and thus does not serve as the ground for restrictive interpretation. Therefore, the technical scope of the disclosure is not interpreted by the above-described embodiment only but is defined on the basis of SUMMARY. In addition, the technical scope of the disclosure includes all modifications falling within the scope of SUMMARY and equivalents thereof.

For example, in the embodiment described so far, the lock-up fluid chamber 34 of the multi-plate lock-up clutch 3 is disposed in the torque converter 2. However, disposition of the lock-up fluid chamber 34 is not limited thereto. The disclosure can also be applied to a vehicle in which the lock-up fluid chamber of the multi-plate lock-up clutch is disposed on outside of the torque converter.

In the embodiment described so far, the description has been made on the example in which the disclosure is applied to the vehicle including the alternator as the generator. However, the disclosure is not limited thereto and can also be applied to a vehicle that includes a motor generator as the generator.

In the embodiment described so far, the description has been made on the example in which the disclosure is applied to the vehicle including the stepped (planetary gear type) automatic transmission (AT), the gear stage of which is set by using friction engagement devices such as the clutches and the brakes and the planetary gear device. However, the disclosure is not limited thereto and can also be applied to a vehicle that includes a continuously variable transmission (CVT) in which a gear ratio is seamlessly adjusted.

In the embodiment described so far, the description has been made on the example in which the control apparatus of the disclosure is applied to the vehicle with the front-engine, front-wheel-drive (FF) layout. However, the disclosure is not limited thereto and can also be applied to a vehicle with a front-engine, rear-wheel-drive (FR) layout and a four-wheel-drive vehicle.

The disclosure can effectively be used for control of the vehicle that includes the engine, the transmission, the lock-up clutch, and the generator.

What is claimed is:

1. A control apparatus for a vehicle, the vehicle including an engine, a transmission, and a generator, the transmission being provided with a lock-up clutch, and the generator being configured to be driven by drive power of the engine to generate electric power, the control apparatus comprising an electronic control unit configured to:
   execute lock-up clutch control in which engagement control of the lock-up clutch is executed;
   execute gear change control in which gear change control of the transmission is executed, the gear change control including upshift gear change control and downshift gear change control, the upshift gear change control being control to upshift a specified gear ratio of the transmission to a gear ratio on a high-speed side, and the downshift gear change control being control to downshift the specified gear ratio of the transmission to a gear ratio on a low-speed side;
   set a value of a target generated voltage of the generator;
   execute power generation control to control a generated voltage of the generator;
   maintain a value of the generated voltage in the power generation control to be constant during the upshift gear change control when the electronic control unit determines that the upshift gear change control of the transmission is executed while the lock-up clutch control is executed during deceleration of the vehicle;

increase the value of the generated voltage in the power generation control to the value of the target generated voltage at a first specified rate during the downshift gear change control when the electronic control unit determines that the downshift gear change control of the transmission is executed while the lock-up clutch control is executed during the deceleration of the vehicle; and maintain the value of the generated voltage to be constant during the gear change control when the electronic control unit determines that the lock-up clutch control is not executed during the deceleration of the vehicle but the gear change control of the transmission is executed.

2. The control apparatus for the vehicle according to claim 1, wherein the electronic control unit is configured to continue maintaining the value of the generated voltage until a specified time elapses from termination of the gear change control when the value of the generated voltage is maintained to be constant during the gear change control.

3. The control apparatus for the vehicle according to claim 1, wherein the electronic control unit is configured to increase the value of the generated voltage in the power generation control to the value of the target generated voltage at a second specified rate when the electronic control unit determines that the lock-up clutch control is executed during the deceleration of the vehicle but the gear change control is not executed, and the second specified rate is a rate of a higher increase tendency than the first specified rate.

4. The control apparatus for the vehicle according to claim 3, wherein the electronic control unit is configured to increase the value of the generated voltage in the power generation control to the value of the target generated voltage at the second specified rate when the electronic control unit determines that the lock-up clutch control is not executed during the deceleration of the vehicle and the gear change control is not executed.

5. A control method for a vehicle, the vehicle including an engine, a transmission, a generator and an electronic control unit, the transmission being provided with a lock-up clutch, and the generator being configured to be driven by drive power of the engine to generate electric power, the control method comprising:

executing, by the electronic control unit, lock-up clutch control, in which engagement control of the lock-up clutch is executed;

executing, by the electronic control unit, gear change control, in which gear change control of the transmission is executed, the gear change control including upshift gear change control and downshift gear change control, the upshift gear change control being control to upshift a specified gear ratio of the transmission to a gear ratio on a high-speed side, and the downshift gear change control being control to downshift the specified gear ratio of the transmission to a gear ratio on a low-speed side;

setting, by the electronic control unit, a value of a target generated voltage of the generator;

controlling, by the electronic control unit, a generated voltage of the generator;

maintaining, by the electronic control unit, a value of the generated voltage in power generation control to be constant during upshift gear change control when the electronic control unit determines that the upshift gear change control of the transmission is executed while the lock-up clutch control is executed during deceleration of the vehicle;

increasing, by the electronic control unit, the value of the generated voltage in the power generation control to the value of the target generated voltage at a specified rate during downshift gear change control when the electronic control unit determines that the downshift gear change control of the transmission is executed while the lock-up clutch control is executed during the deceleration of the vehicle; and maintaining the value of the generated voltage to be constant during the gear change control when a determination is made that the lock-up clutch control is not executed during the deceleration of the vehicle but the gear change control of the transmission is executed.

* * * * *